US008671270B2

(12) United States Patent
Oigawa et al.

(10) Patent No.: US 8,671,270 B2
(45) Date of Patent: Mar. 11, 2014

(54) SYSTEM CONNECTED TO A MEMORY FOR STORING AN EXTENDED FIRMWARE HAVING A BIOS EMULATOR IN WHICH THE BIOS EMULATOR IS OVERWRITTEN USING A INTERRUPTION VECTOR FOR HANDLING A BIOS CALL

(75) Inventors: Harumi Oigawa, Yokohama (JP); Takashi Shimojo, Hadano (JP); Akira Takeshita, Hadano (JP); Takao Totsuka, Hadano (JP)

(73) Assignee: Hitachi, Ltd., Tokyo (JP)

( * ) Notice: Subject to any disclaimer, the term of this patent is extended or adjusted under 35 U.S.C. 154(b) by 870 days.

(21) Appl. No.: 12/350,994

(22) Filed: Jan. 9, 2009

(65) Prior Publication Data

US 2009/0193244 A1    Jul. 30, 2009

(30) Foreign Application Priority Data

Jan. 10, 2008   (JP) ................................ 2008-003333

(51) Int. Cl.
*G06F 9/00*     (2006.01)
*G06F 3/00*     (2006.01)
*G06F 9/455*    (2006.01)

(52) U.S. Cl.
USPC ............. 713/2; 713/1; 710/1; 703/26; 703/27

(58) Field of Classification Search
USPC ......... 713/1, 2; 712/244, 209; 703/24, 26, 23, 703/27; 710/1; 709/203; 719/321, 318
See application file for complete search history.

(56) References Cited

U.S. PATENT DOCUMENTS

| | | | | |
|---|---|---|---|---|
| 6,006,029 A * | 12/1999 | Bianchi et al. | | 703/24 |
| 6,081,890 A * | 6/2000 | Datta | | 713/1 |
| 7,103,529 B2 | 9/2006 | Zimmer | | |
| 7,484,083 B1 * | 1/2009 | Ilyasov | | 713/1 |
| 7,571,090 B2 * | 8/2009 | Kinney | | 703/26 |
| 2004/0024924 A1 * | 2/2004 | Szewerenko et al. | | 710/1 |
| 2005/0114639 A1 * | 5/2005 | Zimmer | | 712/244 |
| 2008/0021695 A1 * | 1/2008 | Wang et al. | | 703/24 |
| 2008/0065875 A1 * | 3/2008 | Thompson | | 713/2 |
| 2008/0243465 A1 * | 10/2008 | Bohizic et al. | | 703/23 |
| 2009/0144754 A1 * | 6/2009 | Zimmer et al. | | 719/318 |

FOREIGN PATENT DOCUMENTS

| | | |
|---|---|---|
| JP | 2005-528665 | 9/2005 |
| JP | 7103529 | 9/2006 |

* cited by examiner

*Primary Examiner* — Thomas Lee
*Assistant Examiner* — Aurel Prifti
(74) *Attorney, Agent, or Firm* — Antonelli, Terry, Stout & Kraus, LLP.

(57) ABSTRACT

A computer system including no basic input/output system (BIOS) for operating bootstrap used in initial activation of a legacy operation system is allowed to perform booting of legacy operation system therefor and includes a central processing unit (CPU) and a memory, in which extended firmware and bootstrap program are stored. The extended firmware includes BIOS emulator and a plurality of device drivers. The extended firmware uses the device driver to make the BIOS emulator perform emulation of BIOS operation in response to a BIOS call issued by the bootstrap program.

8 Claims, 4 Drawing Sheets

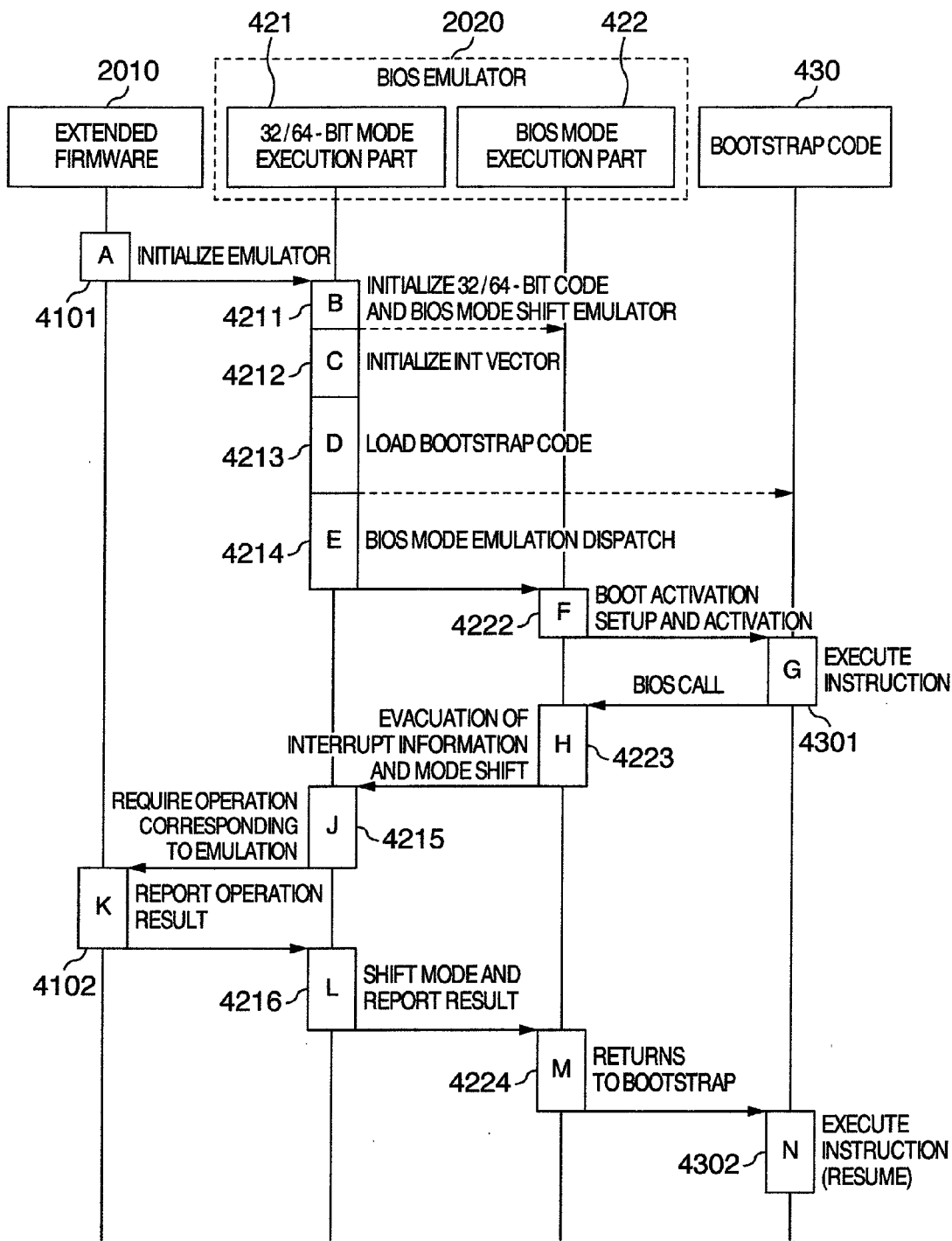

SYSTEM CONNECTED TO A MEMORY FOR STORING AN EXTENDED FIRMWARE HAVING A BIOS EMULATOR IN WHICH THE BIOS EMULATOR IS OVERWRITTEN USING A INTERRUPTION VECTOR FOR HANDLING A BIOS CALL

INCORPORATION BY REFERENCE

The present application claims priority from Japanese application JP2008-003333 filed on Jan. 10, 2008, the content of which is hereby incorporated by reference into this application.

BACKGROUND OF THE INVENTION

The present invention relates to a computer system and a legacy boot method for the computer system and more particularly to a computer system which can boot a legacy operating system in a computer system having no physical BIOS (Basic Input/Output System) and a legacy boot method for the computer system.

Control for an input/output (I/O) device performed by boot processing of the legacy operating system which is an old-type operating system requiring BIOS provided in a computer system is performed by calling BIOS by INT (interrupt) instruction issued by bootstrap code and executing BIOS code incorporated in ROM of physical I/O device provided in hardware. Heretofore, this control gets no further than realizing I/O operation of low level in boot processing on a monitor of virtual machine.

As a prior art relative to booting of the legacy operating system, there is known technique described in U.S. Pat. No. 7,103,529B, Zimmer, for example. This prior art relates to technique of improving security for I/O control in virtual computer and technique of emulating BIOS code of I/O device when extended firmware is used upon calling of BIOS.

SUMMARY OF THE INVENTION

The above prior art relates to security measures in case where a plurality of I/O device drivers provided by vender are operated in virtual machine and does not consider the method of realizing boot of legacy operating system in the computer system having no BIOS.

Generally, computer systems which can boot new operating system without requiring BIOS are spreading, although the legacy operating system is much utilized even in the present. Provision of BIOS depends on vender who provides BIOS and accordingly BIOS provided by vender is difficult to adapt to expansion and change by a manufacturer side which provides a computer system in form of an extended firmware.

It is an object of the present invention to provide a computer system which can boot a legacy operating system in a computer system having no BIOS and a boot method of the legacy operating system for the computer system.

Further, it is another object of the present invention to provide a computer system utilizing a driver binary code provided by vender of the I/O device to perform emulation of an execution code itself relating to an initialization and an I/O driving provided by the I/O device driver when the emulation is performed in the I/O device which does not support BIOS code, and a boot method of the legacy operating system for the computer system.

According to the present invention, a computer system including no BIOS for operating bootstrap used in the initial activation of a legacy operating system includes a central processing unit (CPU) and a memory, in which an extended firmware and a bootstrap program are stored and the extended firmware includes a BIOS emulator and a plurality of device drivers. The extended firmware uses the device driver to make the BIOS emulator perform emulation of BIOS operation in response to a BIOS call issued by the bootstrap program.

According to the present invention, the legacy operating system can be booted for both of the I/O device provided by vender having no BIOS code and the I/O device including BIOS.

Other objects, features and advantages of the invention will become apparent from the following description of the embodiments of the invention taken in conjunction with the accompanying drawings.

BRIEF DESCRIPTION OF THE DRAWINGS

FIG. 4 is a sequence chart illustrating dispatching from initialization of BIOS emulator environment until execution of bootstrap and processing operation of BIOS emulator and extended firmware upon calling of BIOS.

DESCRIPTION OF THE EMBODIMENTS

Embodiments of a computer system and a legacy boot method for the computer system according to the present invention are now described in detail with reference to the accompanying drawings.

Before explanation of embodiments of the present invention, configuration of a prior-art computer system in which a legacy operating system requiring BIOS can be operated is first described.

Figure 1:
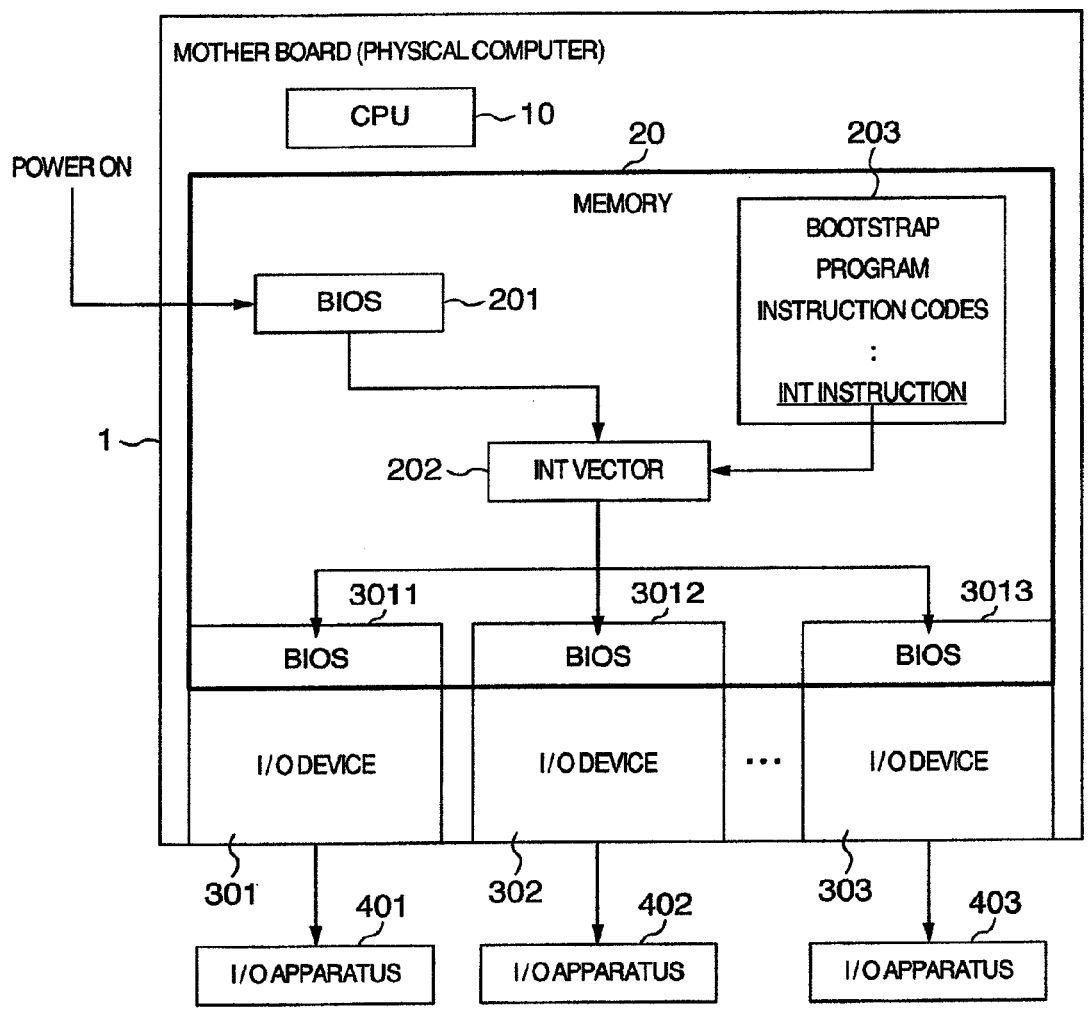
FIG. 1 is a block diagram illustrating an example of a prior-art computer system in which a legacy operating system requiring BIOS can be operated.

FIG. 1 is a block diagram illustrating an example of a prior-art computer system in which a legacy operating system requiring BIOS can be operated.

The computer system illustrated in FIG. 1 is mounted on a mother board 1 as a physical computer and includes a central processing unit (CPU) 10, a memory 20 and a plurality of I/O devices 301 to 303 mounted on the mother board 1. The I/O devices 301 to 303 are connected to I/O apparatuses 401 to 403, respectively. BIOS 3011 to 3013 corresponding to the I/O devices 301 to 303, respectively, are loaded into the memory 20.

When the computer system configured above is turned on to be supplied with power, BIOS 201 and INT vector 202 required for initial activation are loaded into the memory 20 from ROM, not shown, mounted in the mother board or an external storage apparatus not shown and a proper boot device of the mounted I/O devices 301 to 303 is selected. A bootstrap program 203 of the legacy operating system is loaded into the memory 20 from I/O of the selected device by execution codes of the BIOS 201 and the CPU 10 executes instruction codes of the bootstrap program 203.

Instruction codes of the legacy bootstrap program 203 contain INT (interrupt) instruction for issuing a BIOS call and when the INT instruction in the bootstrap program 203 is executed, an interrupt occurs by the software, so that a specific interrupt program is executed in accordance with a setting of INT vector 202. The interrupt program is composed of BIOS codes and the BIOS codes of I/O devices 301 to 303 are executed to control the I/O apparatuses 401 to 403. The operating system is read in from one I/O apparatus by such control of the I/O apparatuses 401 to 403 to be booted in the computer system.

Figure 2:
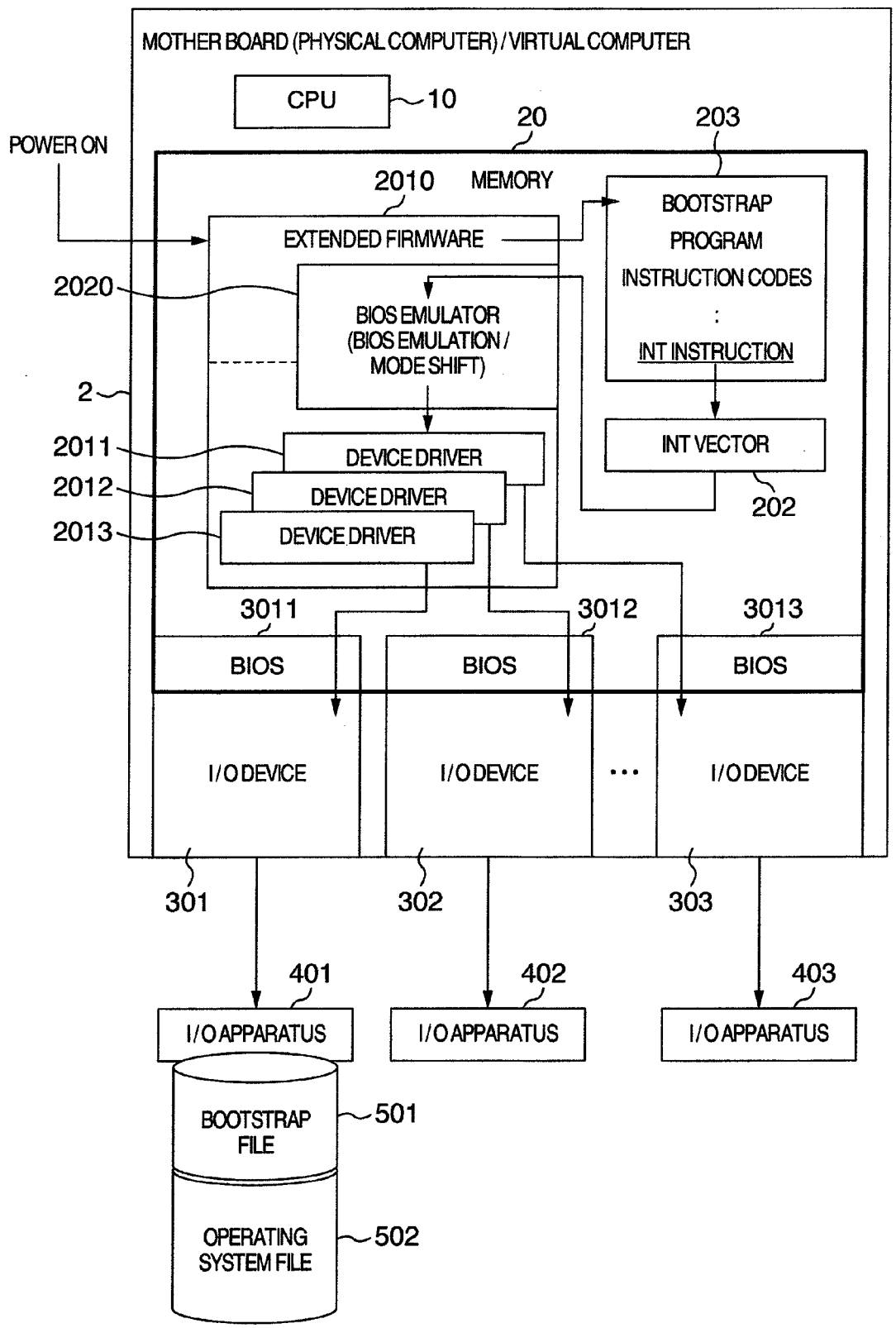
FIG. 2 is a block diagram schematically illustrating an example of a computer system including BIOS emulator according to an embodiment of the present invention.

FIG. 2 is a block diagram schematically illustrating an example of a computer system according to an embodiment of the present invention including a BIOS emulator.

The computer system illustrated in FIG. 2 is mounted on a mother board 2 as a physical computer or virtual computer and includes a central processing unit (CPU) 10, a memory 20 and a plurality of I/O devices 301 to 303 mounted on the mother board 2. The I/O devices 301 to 303 are connected to I/O apparatuses 401 to 403, respectively. BIOS 3011 to 3013 corresponding to the I/O devices 301 to 303, respectively, are loaded into the memory 20. The computer system shown in FIG. 2 includes extended firmware 2010 loaded into the memory 20. The extended firmware 2010 includes a plurality of device drivers 2011 to 2013 for driving the I/O devices and a BIOS emulator 2020 using the extended firmware 2010 as a platform.

The BIOS 3011 to 3013 corresponding to the I/O devices 301 to 303, respectively, are sometimes provided as memory cards and are not sometimes provided in the I/O device 301 to 303, respectively.

When the computer system according to the embodiment of the present invention configured above is turned on to be supplied with power, the extended firmware 2010 is loaded into the memory 20 from ROM, not shown, mounted in the mother board or external storage apparatus not shown. The device drivers 2011 to 2013 and INT vector 202 are properly loaded into the memory 20 by the extended firmware 2010 and bootstrap program 230 is further loaded into the memory 20. The extended firmware 2010 adopts the form of bundling the BIOS emulator 2020 to the extended firmware 2010 so as to load the BIOS emulator 2020, so that the BIOS emulator 2020 is loaded into the memory 20 by the extended firmware 2010.

The extended firmware 2010 properly initializes the I/O devices 301 to 303 and confirms the connection state of the I/O apparatuses 401 to 403 connected to the I/O devices 301 to 303, respectively, to detect a device by which boot can be performed properly. In the example shown in FIG. 2, it is supposed that the I/O apparatus 401 is a storage device and the bootstrap file 501 and the operating system file 502 are registered in the I/O apparatus 401. At this time, when the I/O apparatus 401 is selected as boot activation I/O device, the extended firmware 2010 drives the device driver 2013 for the I/O device 301, so that the bootstrap file 501 is loaded into the memory 20 and the bootstrap program 203 is executed.

Instruction codes of the bootstrap program 203 are executed successively, so that INT instruction requiring I/O operation by BIOS is executed soon. When the INT instruction is executed, INT vector 202 is indexed by software interrupt and codes of BIOS emulator 2020 linked to the vector are called, so that BIOS emulation/mode shift is performed and device driver 2013 of extended firmware 2010 is controlled to thereby perform I/O drive. The operating system is read in by the I/O drive to be booted in the computer system.

Figure 3:
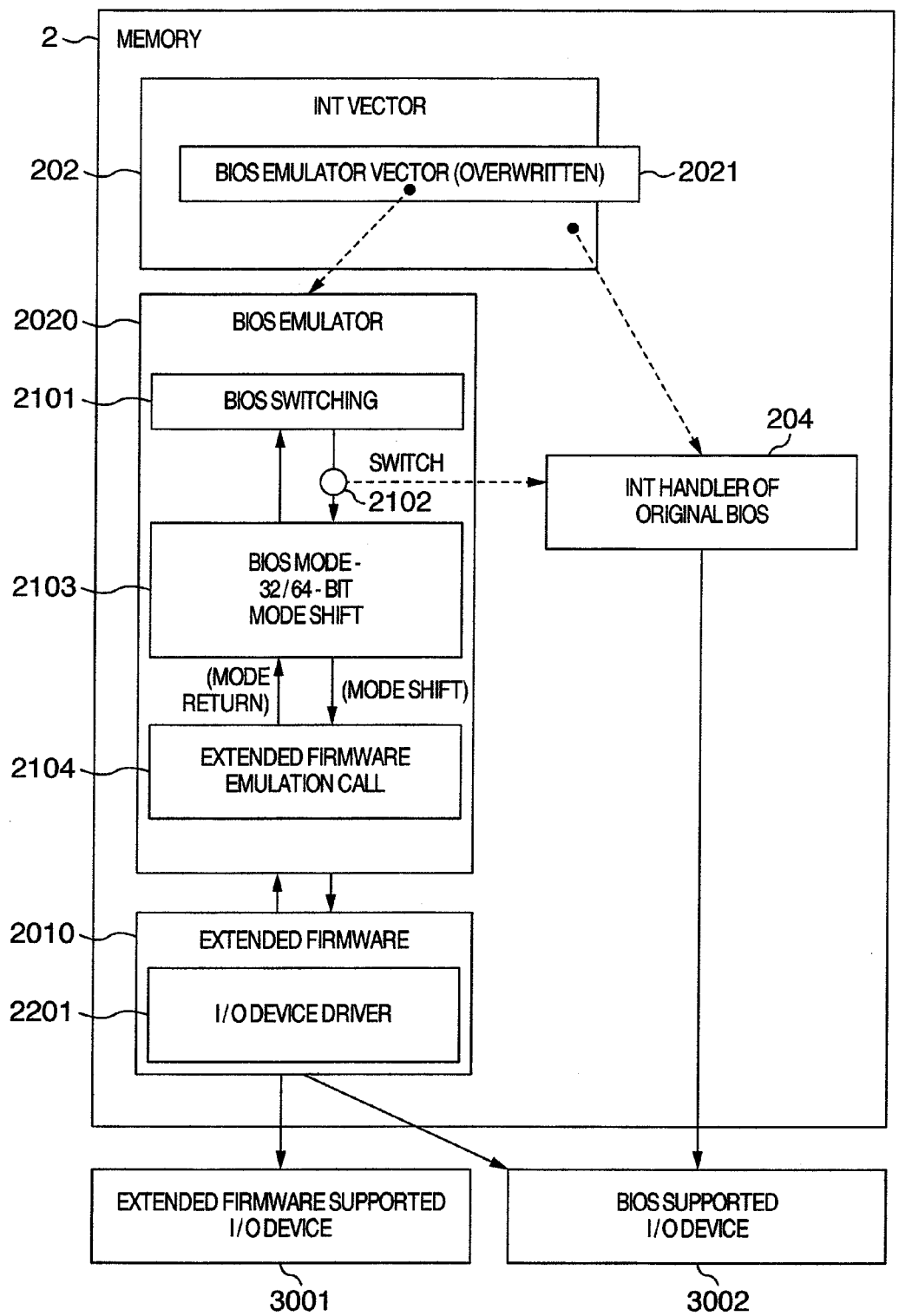
FIG. 3 is a diagram illustrating processing operation of BIOS emulation.

FIG. 3 is a diagram illustrating processing operation of BIOS emulator 2020. The processing operation of the BIOS emulator is now described.

(1) The BIOS emulator vector 2021 included in the extended firmware 2010 is overwritten on the INT vector 202 loaded in the memory 2 and when a BIOS call is issued by INT instruction, the BIOS emulator vector 2021 hands over processing to the BIOS emulator 2020.

(2) The BIOS emulator 2020 first judges the BIOS switching 2101 and when the BIOS emulator calls up legacy supported BIOS which is BIOS supported device, the BIOS emulator hands over processing to INT handler 204 of original BIOS, so that BIOS supported I/O device 3002 is driven by execution of legacy BIOS as usual.

(3) In the judgment of BIOS switching 2101, when it is judged that emulation is to be performed, a type of software interrupt upon issuing of interrupt (INT) is analyzed and information upon issuing of interrupt is held. Then, the BIOS mode 32/64-bit mode shift 2103 are performed to shift the processing from 16-bit mode of the BIOS mode operating in X86 or X64 CPU architecture to the 32-bit protect or 64-bit mode in which the extended firmware 2010 can be operated.

(4) Thereafter, the extended firmware emulation call 2104 is performed to call up the extended firmware 2010, so that the I/O driver 2201 included in the extended firmware 2010 drives the extended firmware supported I/O device 3001.

The result of I/O driving by processing of the BIOS emulator 2020 is returned to the extended firmware emulation call 2104 by the extended firmware 2010 and the 32/64-bit mode is shifted to the BIOS mode shift 2103. The result is returned as a BIOS call result from the BIOS switch 2101 to the INT issuing source.

Furthermore, in the above emulation processing, when the I/O device driver 2201 for controlling the BIOS supported I/O device 3002 is included in extended firmware 2010, the emulation can be performed.

FIG. 4 is a sequence chart illustrating dispatching from the initialization of the BIOS emulation environment until the execution of bootstrap, and the processing operation of the BIOS emulator and the extended firmware upon calling of BIOS. The dispatching and the processing operation are now described.

(1) When the computer system is powered on, the extended firmware 2010 is activated in the initial operation and the extended firmware 2010 initializes 32/64-bit emulation execution part 421 (corresponding to the BIOS mode-32/64-bit mode shift 2103 shown in FIG. 3) of the BIOS emulator 2020 in the processing A 4101.

(2) Thereafter, the 32/64-bit emulation execution part 421 initializes the 32/64-bit code and BIOS mode shift emulator of BIOS mode execution part 422 (corresponding to extended firmware emulation call 2104 shown in FIG. 3) of BIOS emulator 2020 in the processing B 4211.

(3) The 32/64-bit emulation execution part 421 bundles an INT vector with the BIOS emulator H 4223 and INT instruction G 4301 to make an entry and initializes the INT vector in the processing C 4212. Furthermore, the 32/64-bit emulation execution part 421 loads the bootstrap file into memory in the processing D 4213 and thereafter performs the BIOS mode emulation dispatch in the processing E 4214.

(4) After dispatch, the BIOS mode execution part 422 prepares the boot activation in the processing F 4222 and changes the execution to bootstrap code 430 of the bootstrap program 203.

(5) Thereafter, instructions of the bootstrap code 430 are executed successively in the processing G 4301 and when the INT instruction required for processing of the BIOS execution appears, the processing is calling the processing of the H 4223 of the BIOS mode execution part 422 of the BIOS emulator 2020 in response to the BIOS call.

(6) The BIOS mode execution part 422 shifts the mode from the BIOS mode to the 32/64-bit mode in the processing H 4223 and calls up the processing J 4215 of the 32/64-bit mode execution part 421 of the BIOS emulator 2020.

(7) The 32/64-bit mode execution part 421 of the BIOS emulator 2020 calls up the processing K 4102 of the extended firmware 2010 for control of I/O device requiring operation demand for each emulation in processing J 4215 and makes the extended firmware 2010 execute the I/O operation.

(8) The extended firmware 2010 makes the 32/64-bit mode execution part 421 of the BIOS emulator 2020 receive operation result in the processing K 4102 in the processing L 4216.

(9) The 32/64-bit mode execution part 421 shifts the mode to the BIOS mode and reports the result to the BIOS execution part 422 in processing K 4102. The BIOS execution part 422 calls up the processing M 4224 and returns emulation result to the bootstrap code 430.

(10) Instruction codes of the bootstrap code 430 are executed successively just after the last INT instruction in the processing N 4302. After this, when an INT instruction is issued in execution of the bootstrap code 430, the operation from processing G 4301 is performed repeatedly until the execution of the bootstrap is ended.

According to the embodiment of the present invention described above, the legacy operation system can be booted in both of the I/O device provided by the vender having no BIOS code and the I/O device provided with BIOS. Moreover, according to the embodiment of the present invention, since the device driver provided by the vender can be used as the I/O driving control as it is, the operation of driving control by the emulation, and the performance during the operation are not influenced and accordingly the quality can be maintained.

The processing in the extended firmware of the embodiment of the present invention can be structured by software and executed by CPU provided in the present invention. Moreover, the program thereof can be stored in a storage medium such as floppy disc (FD), compact disc read-only memory (CDROM), digital versatile disc (DVD) to be provided and can be further provided as digital information through a network.

In the embodiment of the present invention, the present invention is applied to the physical computer, although the present invention can be also applied to a virtual computer.

According to the present invention, the personal users utilizing the legacy operating system and the server developers providing enterprise servers can develop a computer system providing legacy environment using extended firmware together.

It should be further understood by those skilled in the art that the foregoing description has been made on embodiments of the invention and that various changes and modifications may be made in the invention without departing from the spirit of the invention and the scope of the appended claims.

The invention claimed is:

1. A computer system including:
a computer including a central processing unit (CPU), a memory and a physical input/output (I/O) device; and
an input/output (I/O) apparatus connected to the physical I/O device,
wherein the memory stores both an extended firmware which drives the physical I/O device, and a bootstrap program which has been loaded by the extended firmware and used in initial operation of the computer system,
the extended firmware includes a basic input/output system (BIOS) emulator and a plurality of device drivers, and overwrites a BIOS emulator vector on an interruption (INT) vector for handling a BIOS call included in the bootstrap program, and
when determining driving of the physical I/O device,
in response to an interruption instruction corresponding to the INT vector overwritten with the BIOS emulator vector executed by the bootstrap program, the BIOS emulator takes over a BIOS process according to the BIOS emulator vector and performs a BIOS switching check to decide a BIOS switching on a basis of whether the physical I/O device mounts a BIOS or not, wherein,
if the BIOS emulator determines as a result of the BIOS switching check that the physical I/O device mounts a BIOS, the BIOS emulator hands over the BIOS process to the BIOS to drive the physical I/O device supported by the BIOS, and
if the BIOS emulator determines as a result of the BIOS switching check that the physical I/O device does not mount the BIOS, the BIOS emulator emulates the BIOS to call the extended firmware to drive the physical I/O device supported by the extended firmware.

2. A computer system according to claim 1, wherein the BIOS emulator performs a CPU operation mode shift processing of shifting a CPU operation mode from a 16-bit real mode of a CPU operation mode of X86 or X64 CPU architecture to a 32-bit protect mode or 64-bit mode in an extended firmware emulation execution environment for each occurrence of the BIOS call during execution of bootstrap while the emulation of BIOS operation is performed without changing the CPU operation mode in a bootstrap processing side.

3. A computer system according to claim 1, wherein the BIOS emulator emulates, as an object of BIOS emulation, I/O device supported by the extended firmware of physical I/O devices included as emulation objects and unsupported by BIOS.

4. A computer system according to claim 1, wherein the BIOS emulator performs emulation by a I/O driving using the device driver of the extended firmware without using BIOS code provided by a card corresponding to a physical I/O device mounted.

5. A computer system according to claim 1, wherein the BIOS emulator hands over processing to the extended firmware so that interrupt event for an INT instruction of a BIOS call instruction issued by the bootstrap program is processed by the extended firmware, and makes the extended firmware take over an I/O processing without performing emulation requiring a decode of an instruction code and a change of interpretation.

6. A boot method for a computer system which includes a computer including a central processing unit (CPU), a memory and a physical input/output (I/O) device and an input/output (I/O) apparatus connected to the physical I/O device, the memory storing both an extended firmware which drives the physical I/O device and a bootstrap program used in initial operation of the computer system, the extended firmware including a basic input/output system (BIOS) emulator and a plurality of device drivers, the method including:
when determining driving of the physical I/O device,
in response to an interruption instruction corresponding to the INT vector overwritten with the BIOS emulator vector executed by the bootstrap program, the BIOS emulator taking over a BIOS process according to the BIOS emulator vector and performing a BIOS switching check to decide a BIOS switching on a basis of whether the physical I/O device mounts a BIOS or not, wherein,
if the BIOS emulator determining as a result of the BIOS switching check that the physical I/O device mounts a BIOS, the BIOS emulator handing over the BIOS process to the BIOS to drive the physical I/O device supported by the BIOS, and if the BIOS emulator determining as a result of the BIOS switching check that the physical I/O device does not mount the BIOS, the BIOS emulator emulating the BIOS to call the extended firmware to drive the physical I/O device supported by the extended firmware.

7. A boot method for a computer system according to claim 6, wherein the BIOS emulator performing CPU operation mode shift processing of shifting a CPU operation mode from a 16-bit real mode of the CPU operation mode of X86 or X64 CPU architecture to a 32-bit protect mode or a 64-bit mode in an extended firmware emulation execution environment for each occurrence of BIOS call during execution of bootstrap while emulation of BIOS operation is performed without changing the CPU operation mode in a bootstrap processing side.

8. A boot method for a computer system according to claim 6, wherein drivers of physical I/O devices of a computer system including BIOS are included in the extended firmware, and the BIOS emulator performing emulation of BIOS operation to perform boot of the legacy operating system required by the computer system including BIOS using the extended firmware.

* * * * *